T. J. LITLE, Jr.
GLOBE OR SHADE FOR GAS LAMPS.
APPLICATION FILED JULY 23, 1910.

982,511.

Patented Jan. 24, 1911.

2 SHEETS—SHEET 1.

WITNESSES
R A Balderson
H M Conmin

INVENTOR
Thomas J. Litle, Jr.
by Bakewell Byrnes & Parmelee
his attys

T. J. LITLE, Jr.
GLOBE OR SHADE FOR GAS LAMPS.
APPLICATION FILED JULY 23, 1910.
982,511.
Patented Jan. 24, 1911.
2 SHEETS—SHEET 2.
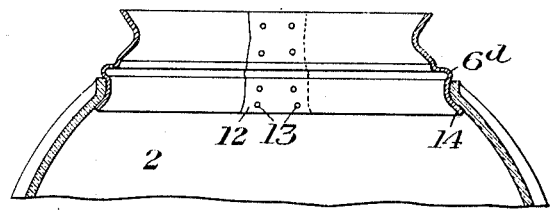
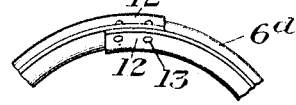
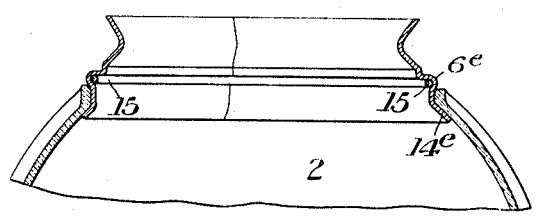
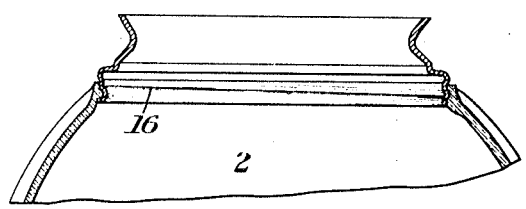
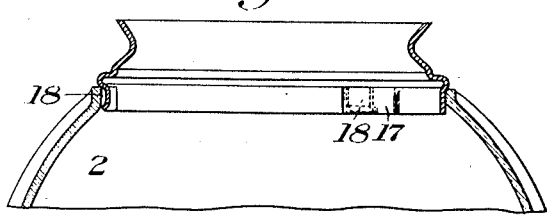
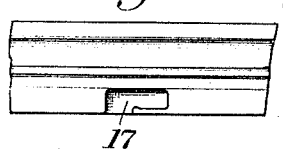
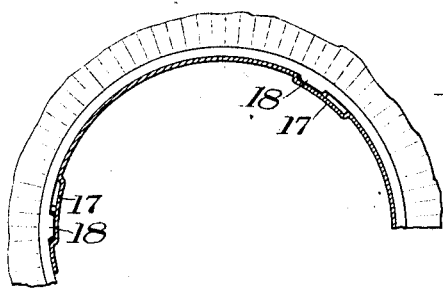
WITNESSES
INVENTOR

UNITED STATES PATENT OFFICE.

THOMAS JAMES LITLE, JR., OF WOODBURY, NEW JERSEY, ASSIGNOR TO WELSBACH LIGHT COMPANY, OF GLOUCESTER CITY, NEW JERSEY, A CORPORATION OF NEW JERSEY.

GLOBE OR SHADE FOR GAS-LAMPS.

982,511. Specification of Letters Patent. Patented Jan. 24, 1911.

Application filed July 23, 1910. Serial No. 573,570.

*To all whom it may concern:*

Be it known that I, THOMAS J. LITLE, Jr., of Woodbury, Gloucester county, New Jersey, have invented a new and useful Improvement in Globes or Shades for Gas-Lamps, of which the following is a full, clear, and exact description, reference being had to the accompanying drawings, forming part of this specification, in which—

Figure 1:
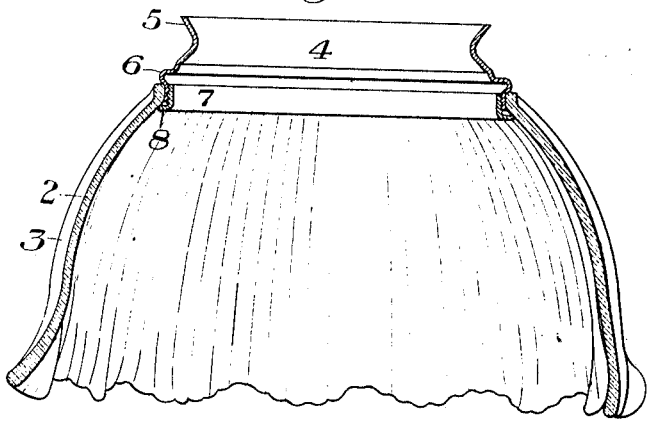
Figure 2:
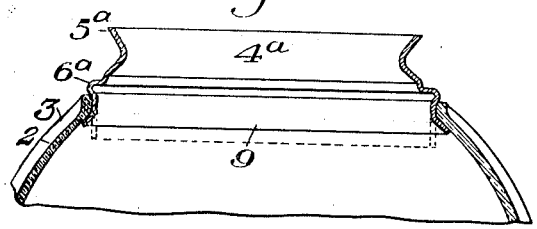
Figure 3:
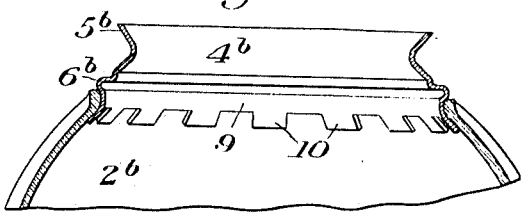
Figure 4:
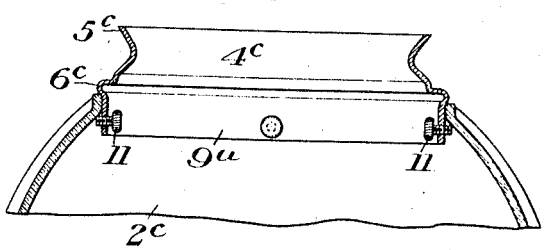

Figure 1 is a side elevation showing one form of my invention. Figs. 2, 3 and 4 are similar views showing modified forms of globe-holding members. Fig. 5 is a similar view of a modified form in which the ring or neck has been split and secured together after insertion in the globe. Fig. 6 is a plan view of a portion of the ring shown in Fig. 5. Figs. 7 and 8 are views similar to Fig. 1, showing still further modifications. Fig. 9 is a similar view showing still a further modification. Fig. 10 is a sectional view through a portion of the ring shown in Fig. 9, and Fig. 11 is a side elevation of a portion of the ring shown in Figs. 9 and 10.

My invention relates to the metal-neck shades or globes, such as disclosed in my Patent No. 961,504, dated June 14th, 1910.

The object of the invention is to provide an article of the character set forth in said patent, that is, a neckless globe or shade having a metal neck as a part thereof; but in which the metal neck portion may be inserted from the top of the globe or shade and secured in place. In the form of said patent, the metal neck is pushed up from below and the glass rests on a flange of the neck, being held thereon by some kind of locking members engaging its top edge. In the present case, I insert the metal neck from the top, and support the shade either upon an expanded portion of the neck itself or upon a neck attachment.

This invention, like that of my patent, relates particularly to globes or shades of thick glass, that is, glass which on account of its thickness is liable to break or crack in its upper portions, which become heated from the gas burner.

The invention is particularly applicable to glass having integral projections which act upon the light rays, although it may be applied to any thick globe or shade which is liable to crack under the heat in its upper portion.

In Fig. 1, 2 represents an inverted glass shade or globe, which is shown as having prism projections 3 thereon. This shade or globe is neckless, and has an enlarged hole in its upper part within which is secured the metal neck 4 having a flared upper flange 5 to receive the burner screws or other fastening means for supporting the article on the burner. The metal neck is provided in its intermediate portion with an outwardly projecting bead or rib 6 which fits against the upper edge of the shade or globe, and below this with a vertical portion which fits within the hole in the globe or shade. This portion is internally screw-threaded to receive the external screw-thread of a separate section 7 having a flange 8 on which the globe rests. In assembling the parts, the metal neck is slipped down within the hole in the globe, and the removable section 7 is screwed up into it, thus securing the parts together and making the integral article consisting of a metal neck shape, which is shipped as one piece.

In Fig. 2 I show a form similar to that of Fig. 1, except that the metal neck $4^a$ is in one piece. In this case the lower portion 9 of the neck is originally of cylindrical form as shown in dotted lines, so that it will slip downwardly from the top into the hole of the shade or globe. The lower part of this portion 9 is then spun or otherwise expanded outwardly into the position shown in full lines, thus giving the support for the shade, the upper edge of which is held between the expanded portion and the shoulder $6^a$. In these figures parts similar to those of Fig. 1 are marked with similar numerals with the letter *a* applied.

In Fig. 3 I show a form similar to that of Fig. 2, except that the depending portion 9 is slitted or slotted to provide for easier expansion, and in this case the prongs or lugs 10 formed by slitting or slotting are simply bent outwardly after the neck is inserted from the top.

In Fig. 4 I show a form wherein the vertical lower portion $9^a$ of the metal neck is substantially cylindrical, and is provided with screws 11 which may be screwed out after the neck is inserted from above, to hold and clamp the shade in place. These screws are forced out under the upper edge of the shade so as to hold the upper edge between the screws and the rib 6ᶜ.

In Fig. 5 I show a form in which the entire metal neck is expansible, having a slip joint in its length. In this case the metal neck is formed of a strip which is bent into a circle with its end portions 12 lapped over each other, as shown in the detail of Fig. 6. This neck may be inserted from above, in collapsed condition. When in place it is expanded, and the lapped portions at the joint are secured by rivets 13, as shown, or by a bayonet lock or snap connection. In this case the metal neck has an integral lower flange 14 on which the globe rests, being held between it and the annular shoulder 6ᵈ of the neck.

In Fig. 7 I show another form in which the neck is inserted from above, the neck being collapsible and being expanded by a solid wire ring 15, which is forced up from below and seats in an annular recess in the neck so as to hold it in expanded position and clamp the shade between the lower flange 14ᵉ and the bead or rib 6ᵉ.

In Fig. 8 I show another form in which the metal neck is inserted from above, the neck in this case having an externally screw-threaded portion 16, and the glass shade or globe having its upper portion formed as a screw thread, or part of a screw thread so that the neck may be screwed thereinto. In this case the edge of the shade or globe is held in the screw threads of the metal neck.

In Figs. 9, 10, and 11 I show another form wherein the metal neck is insertible from above and is secured to the glass shade by a bayonet joint connection. In this case the metal neck has the bayonet lock recesses 17 shown in Fig. 11, and the upper edge of the glass body is provided with inward projections 18 which will slip into the slots and then by turning the neck or shade they are locked together in the ordinary bayonet-lock fashion.

The advantages of my invention will be obvious to those skilled in the art, since a simple, cheap and effective form of metal neck shade or globe is provided in which the neck may be inserted from above and secured in place so that the article becomes a one-piece shade or globe so far as shipping and use are concerned. As in my previous form, the cracking of the thick glass of the shade or globe is prevented by the use of the metal neck secured in the hole of the neckless globe or shade; while an advantage is obtained by the insertion of the neck from the top.

Many variations may be made in the form and arrangement of the metal collar, the form and size of the globe, and the means for securing them together without departing from my invention.

By the statement in my claims that the upper part of the metal neck is "externally shaped to be engaged by inwardly projecting shade-holding members of the gas burner", I do not intend to limit myself to the concave form shown, but intend to differentiate thereby from internal holders, such as are used in connection with electric lamp sockets. In other words, I intend to cover any shape of the upwardly projecting portion which adapts this portion for receiving the inwardly projecting holding members of a gas burner, whether in the form of screws or in any other form.

I claim:—

1. As a new article of manufacture, a glass globe or shade for incandescent gas lamps, having an upper hole, a metal neck inserted from above and projecting above the glass body, said neck having a stop shoulder to limit the inserting movement of the metal neck and having its lower portion provided with holding means arranged to retain the upper edge of the glass shade between it and the stop shoulder, the upper portion of the metal neck above the glass shade being shaped exteriorly to receive the inwardly projecting supporting devices of the burner; substantially as described.

2. As a new article of manufacture, a glass globe or shade for inverted incandescent gas lamps, having an upper hole, a metal neck inserted from above and projecting above the glass body, said neck having an intermediate annular stop shoulder to limit the inserting movement, and provided in its lower part with locking members arranged to hold the upper edge of the glass globe between said members and the stop shoulder, the upwardly projecting portion of the metal neck above the glass globe being externally shaped to be engaged by inwardly projecting shade-holding members of the gas burner; substantially as described.

3. As a new article of manufacture, a glass globe or shade for inverted incandescent gas lamps, in combination with a metal neck inserted from above and having an intermediate stop shoulder to limit the inserting movement, the upper portion of the metal neck projecting above and beyond the upper edge of the glass body, and provided in its lower portion with holding means to secure the upper edge of the glass body between such means and the stop shoulder, the upwardly projecting portion of the metal neck above the glass being externally shaped to receive the inwardly projecting shade-holding members of a burner; substantially as described.

4. As a new article of manufacture, a glass globe or shade for inverted incandescent gas lamps, having an upper hole of such diameter as to remove the upper edge of the glass body from the burner, in combination with a metal neck inserted from above and having an intermediate stop shoulder to limit the inserting movement, and provided in its lower portion with holding means to secure the upper edge of the glass body between such means and the stop shoulder, the upwardly projecting portion of the metal neck above the glass being of reduced diameter and externally shaped to receive the inwardly projecting shade-holding members of a burner; substantially as described.

In testimony whereof, I have hereunto set my hand.

THOMAS JAMES LITLE, JR.

Witnesses:
  JOSEPH H. JOHNSON,
  W. G. THOMPSON.